US007440950B2

(12) United States Patent
Horvitz et al.

(10) Patent No.: US 7,440,950 B2
(45) Date of Patent: *Oct. 21, 2008

(54) TRAINING, INFERENCE AND USER INTERFACE FOR GUIDING THE CACHING OF MEDIA CONTENT ON LOCAL STORES

(75) Inventors: Eric J. Horvitz, Kirkland, WA (US); Carl M. Kadie, Bellevue, WA (US); Stuart Ozer, San Francisco, CA (US); Curtis G. Wong, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 225 days.

This patent is subject to a terminal disclaimer.

(21) Appl. No.: 11/124,862

(22) Filed: May 9, 2005

(65) Prior Publication Data

US 2005/0210520 A1      Sep. 22, 2005

Related U.S. Application Data

(63) Continuation of application No. 09/825,800, filed on Apr. 4, 2001, now Pat. No. 6,947,935.

(51) Int. Cl.
G06F 17/30 (2006.01)
G06F 13/00 (2006.01)

(52) U.S. Cl. ........................................ 707/10; 725/46
(58) Field of Classification Search ................ None
See application file for complete search history.

(56) References Cited

U.S. PATENT DOCUMENTS 5,493,692 A    2/1996 Theimer et al.
5,537,593 A *  7/1996 Diamond et al. ............ 719/313
5,544,321 A    8/1996 Theimer et al.
5,555,376 A    9/1996 Theimer et al.

(Continued)

FOREIGN PATENT DOCUMENTS

WO         9800787         1/1998

OTHER PUBLICATIONS

Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.

(Continued)

*Primary Examiner*—Cam-Y Truong
*Assistant Examiner*—Fred I Ehichioya
(74) *Attorney, Agent, or Firm*—Amin, Turocy & Calvin, LLP

(57) ABSTRACT

A system and method of caching multimedia data employing probabilistic predictive techniques is provided for facilitating local storage of a subset of available viewing selections by assigning a value to a selection and retaining selections in the cache depending on the value and size of the selection. The value assigned to an item can represent the time-dependent likelihood that a user (or group of users) will review an item at some time in the future, current viewing habits as well as habits over a particular time segment. A value assigned to a selection dynamically changes according to a set of cache retention policies, where the value can be time-dependent functions that decay based on the class of the item, for example. A selections value may also change based on changes in viewing habits, time segments or a user's modification of the cache retention policies.

18 Claims, 12 Drawing Sheets

U.S. PATENT DOCUMENTS

| | | | |
|---|---|---|---|
| 5,603,054 | A | 2/1997 | Theimer et al. |
| 5,611,050 | A | 3/1997 | Theimer et al. |
| 5,704,017 | A | 12/1997 | Heckerman et al. |
| 5,790,935 | A * | 8/1998 | Payton .................. 725/91 |
| 5,812,865 | A | 9/1998 | Theimer et al. |
| 6,005,597 | A * | 12/1999 | Barrett et al. ............. 725/46 |
| 6,012,052 | A | 1/2000 | Altschuler et al. |
| 6,029,176 | A * | 2/2000 | Cannon ............... 707/104.1 |
| 6,067,565 | A | 5/2000 | Horvitz |
| 6,088,718 | A | 7/2000 | Altschuler et al. |
| 6,144,964 | A | 11/2000 | Breese et al. |
| 6,233,734 | B1 * | 5/2001 | Macrae et al. ............. 725/50 |
| 6,466,232 | B1 | 10/2002 | Newell et al. |
| 6,513,046 | B1 | 1/2003 | Abbott, III et al. |
| 6,549,915 | B2 | 4/2003 | Abbott, III et al. |
| 6,714,917 | B1 | 3/2004 | Eldering et al. |
| 6,747,675 | B1 | 6/2004 | Abbott et al. |
| 6,769,127 | B1 * | 7/2004 | Bonomi et al. ............ 725/39 |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 6,934,964 | B1 | 8/2005 | Schaffer et al. |
| 6,970,859 | B1 | 11/2005 | Brechner et al. |
| 7,146,627 | B1 * | 12/2006 | Ismail et al. ............. 725/47 |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2005/0034078 | A1 | 2/2005 | Abbott et al. |

OTHER PUBLICATIONS

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al:, Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

TRAINING, INFERENCE AND USER INTERFACE FOR GUIDING THE CACHING OF MEDIA CONTENT ON LOCAL STORES

CROSS-REFERENCE TO RELATED APPLICATIONS

This application is a Divisional of U.S. patent application Ser. No. 09/825,800, filed on Apr. 4, 2001 and entitled "TRAINING, INFERENCE AND USER INTERFACE FOR GUIDING THE CACHING OF MEDIA CONTENT ON LOCAL STORES," the entirety of which is incorporated herein by reference.

TECHNICAL FIELD

The present invention relates to information retrieval and processing, and more particularly to a system and method for storing selected information in a local storage system as a function of a user's previous reviewing habits over different time intervals.

BACKGROUND OF THE INVENTION

Recently, there has been an increasing trend of the amount of information available on any given subject matter due to the interconnection of computer via networks (e.g., the Internet) and the increased availability of inexpensive data storage. In many situations people attempting to retrieve information on a subject area are overwhelmed with a vast amount of information. Data that is desired becomes difficult to locate amongst the vast amount of information presented to a user. Various known information retrieval systems have evolved that attempt to avoid the problem of information overload by performing a ranking or prioritization of information. These systems attempt to retrieve and provide information based on an approximation of how useful, interesting, and/or responsive the information is likely to be to a system user.

For example, many systems provide search engines, which search database contents or "web sites" according to terms provided by a user query. However, limitations of search heuristics often cause irrelevant content to be returned in response to a query. Furthermore, the vast wealth of available information makes it difficult to separate irrelevant content from relevant content. Other systems organize content based on a hierarchy of categories. These systems suffer from the fact a user may select a category to navigate through and determine that the content of the category is of no interest to the user. The user must then backtrack through one or more of the hierarchical categories to return to the available categories. The user will have to continue this process until the user locates the desired information.

In view of the shortcomings of the systems discussed above, probabilistic predictive models have been developed. Collaborative filtering systems are one particular type of predictive probabilistic predictive model. Collaborative filtering systems predict preferences of a user based on known attributes of the user, as well as known attributes of other users. For example, a preference of a user may be whether they would like to watch a particular television show, while an attribute of the user may include their age, gender and income. In addition, the attributes can contain one or more of the user's known preferences, such as the user's dislikes of certain other shows. A user's preference can also be predicted based on the similarity of that user's attributes to other users. Typically, attributes are provided numerical values (e.g., a vote) and a weighted sum of the attribute values are utilized to determine a preference. Additionally, correlation computations are employed for a given user and other users to predict the preference of a user for a particular selection. Some collaborative filtering systems employ clustering algorithms to determine users whose preferences seem to be similar.

Collaborative filtering systems have been determined to be relatively successful in selecting desirable preferences of a user given adequate attributes of the user. However, in certain circumstances a single system may be employed that is utilized by multiple users all having different attributes and preferences. For example, a single household may all share a single computer or a single television device. In these circumstance, there is no way for a collaborative filtering system to determine which of the household members is utilizing the system at any given time without the member identifying themselves.

In today's world of complex media offerings and time-shifted viewing of streamed content, potentially at lower than real-time rates from sources such as satellites there is an unmet need for assisting users in caching content onto local stores that they are most interested in reviewing. For example, some services offer users upwards of 500 programs to select amongst. Such offerings also provide a large hard disc for local caching of content. However, even these large hard discs have a limited amount of storage for caching content locally.

Accordingly, there is an unmet need in the art for providing probabilistic predictive techniques to an information retrieval system and a local storage system that can be employed on a shared device.

SUMMARY OF THE INVENTION

The present invention is related to a system and method of caching data guided by a probabilistic predictive model, such as collaborative filtering models and other statistical models that can be used to infer the likelihood of a user's preferences for content. The system and method have particular application to multimedia systems for providing storage of a subset of available viewing selections by assigning a value or utility to a selection and retaining selections in the cache depending on the value and size of a selection. An initial value of an item can be based on the user's viewing habits, the user's viewing habit over particular time segment (e.g., early morning, late morning, early afternoon, late afternoon, primetime, late night) and/or viewing habits of a group of user's during a particular time segment.

A value assigned to a selection dynamically changes according to a set of cache retention policies. For example, a selection's value may be reduced as the selection ages because a user is less likely to view the selection over time. Additionally, the value of a selection may change based on changes on a user's viewing habits, changes in time segments or a user's modification of the predefined rules or policies. Such policies can be sensitive to the class of content cached. For example, the value of news broadcasts may decay more quickly with the age of the content, in comparison to documentary material covering a topic area that a user has conveyed an interest. In one aspect of the invention, a utility-directed knapsack analysis is continuously performed to store newly available content into available memory, based on the consideration of the "expected value density" of the content, which is defined as the ratio of the value assigned to some media content and the memory cost of storing the content based on the size of the content.

Another aspect of the invention relates to the situation where all available memory becomes totally committed. In this event, newly available content overwrites previously stored content when the expected value density of the new content exceeds the expected value density of older content. The expected utility of maintaining content in memory can be determined by the ratio of the current utility as a function of the age of the item, based on the policy that is active for the particular item. The value of content stored in cache decays based on the class or type of content, in accordance with a time-dependent utility model, for example, utility becomes a function of initial utility, age and content class. Thus, the expected value density of content stored in memory is the ratio of the size of the object and the current utility of the object as determined by the time-dependent utility model.

In one aspect of the invention, the initial value of content is the probability that the user will review the content and the change in the likelihood that the user will review content with the time that it has been stored in memory without review. Such a probability can be taken as indicated by a score provided by an inferential model of a user's preference, such as the score assigned by a collaborative filtering model. The collaborative filtering model can be enhanced with popularity filtering. In another approach, a time-centric collaborative filtering model can be employed.

Another aspect of the invention relates to providing a separate storage area and policies for selections that are cached for use approximately in real time. For example, the invention solves the problem of the situation where a user has missed the commencement of a broadcast because of tardiness based on transportation or meeting delays. In such a situation, a broadcast television show is already in progress when the user comes available in an appropriate place to review the television content. The present invention provides for the storage of N number of selections based on predictions of selections a viewer is most likely going to watch at any given moment and begins recording those shows into a cache at the beginning of the program. In the event that the viewer turns on a selection of one of the N selections of interest, the remaining non-selected selections are removed from the separate storage area. In the event that none of the selections are selected, the selections age quickly and are removed from the separate storage area so that new selections in a new time period may be stored. Alternatively, the selections may be stored in the general storage area with a value decay that is quicker than other selections based on the nature of the content and/or the associated value assigned to the content.

Another aspect of the invention relates to a system and method for storing portions of data of selections in cache if the selections have data viewing rates that are faster than the rate the data can be received from a source that makes the content available on demand. Once a selection is made and viewing begins, the amount of data in the cache is always maintained such that viewing is not interrupted. In such cases, speculative recording of television content based on expected value density can store content at lower cost, as the complete content does not have to be stored. Rather an amount of content that ideally buffers the content for real-time viewing can be stored. Such buffering of content effectively raises the value density of content that can be accessed as the ratio of value to cost is greater.

To the accomplishment of the foregoing and related ends, the invention then, comprises the features hereinafter described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

The present invention is related to a system and method of caching data guided by a probabilistic predictive model, such as collaborative filtering models and other statistical models that can be used to infer the likelihood of a user's preferences for content. The system and method have particular application to multimedia systems for providing storage of a subset of available viewing selections by assigning a value or utility to a selection and retaining selections in the cache depending on the value and size of a selection. An initial value of an item can be based on the user's viewing habits, the user's viewing habit over particular time segment (e.g., early morning, late morning, early afternoon, late afternoon, primetime, late night) and/or viewing habits of a group of user's during a particular time segment.

The present invention has particularly useful application to multimedia systems where viewing content is time shifted at lower than real-time rates from media delivery systems (e.g., satellite systems). The present invention provides a system and method for determining recommendations of media selections of system users most likely to be watched by a system user and employing these recommendations to store (e.g., cache) information locally corresponding to the recommendations. The storing of the information is determined by inferences, by employing probabilistic predictive models, such as collaborative filtering techniques, based on the time interval or time segment of previously viewed selections. The probabilistic predictive techniques of the present invention allow for the system to predict the likelihood that a user will prefer a program regardless of the user's genre by evaluating the time interval of previously viewed information for a corresponding system.

Figure 1:
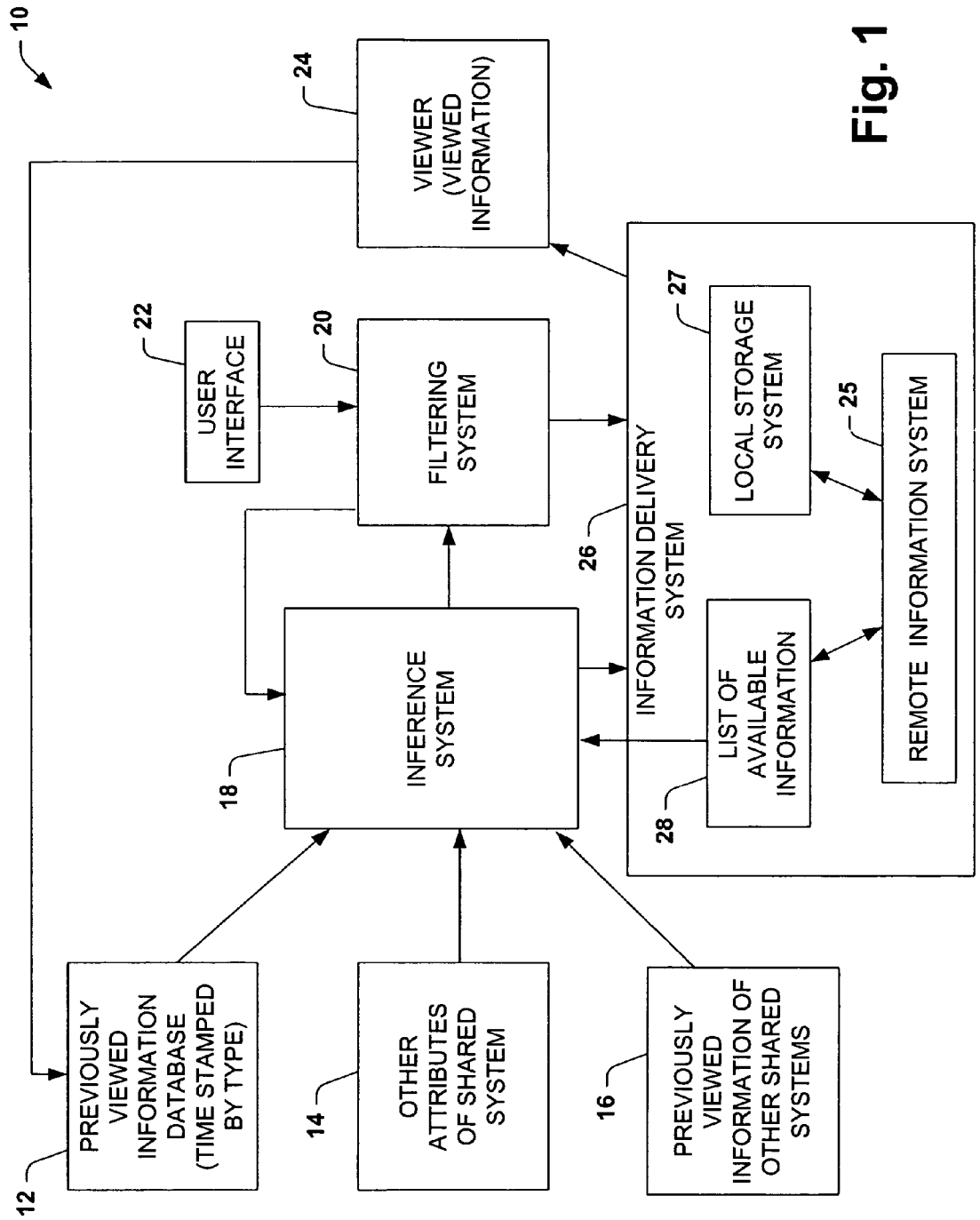
FIG. 1 illustrates a block diagram of a system utilizing an inference system in accordance with one aspect of the present invention.

FIG. 1 illustrates an example of a system 10 utilizing an inference system 18 employing probabilistic predictive model techniques, such as collaborative filtering techniques or other statistical model techniques that can be used to infer the likelihood of a user's preferences for content. The inference system 18 infers preferences of user's of the system and provides values to items for caching in a local storage system 27. In the present example, the inference system 18 ranks items or selections based on viewing habits of users of the system 10 in addition to considering time segments or intervals of those viewing habits. It is to be appreciated that various inference techniques may be employed to carry out the present invention (e.g., correlation techniques, Bayesian machine learning, statistical decision trees, etc.). In a training mode, the inference system 18 utilizes selections of previously viewed information that is logged in a user's database 12 and selections of previously viewed information that is logged in databases 16 of other shared systems. It is to be appreciated that the database information may be stored locally at the system 10, remotely at a remote server or the like (e.g., in a single database) or across a number of servers. Additionally, the inference system 18 may reside locally at the system 10, remotely at a remote server or across a number of servers. The inference system 18 is trained by examining selections reviewed by a large pool of users for more than a threshold amount of time. Negative votes are also considered by monitoring selections jumped away from after being reviewed briefly. Temporal filtering can then be employed to provide a reviewed item list and a recommendation list for a particular time segment.

Title selections are time stamped with different time segments by event type (e.g., title) and class type (e.g., news, documentary, sports events, etc.). The log data is annotated with distinctions about the time of the day that a system user has viewed the information. For example, a day can be segmented into early morning, mid-morning, afternoon, late afternoon, early evening, evening, late night. Additional segments can include information that is viewed on weekdays verse weekends. Furthermore, non-weekdays can be further subdivided into Saturday, Sunday and holidays. Elements from a dataset are considered tagged with these time segments or intervals and trained with this data employing conventional collaborative filtering techniques. Various probabilistic predictive model techniques may be employed to carry out the present invention (e.g., correlation techniques, Bayesian machine learning, probability tree networks, etc.).

In real-time, appropriate information or evidence about a user's preferences is inputted into the inference system 18. Evidences of preferences include information from previously selected information from the database 12, other attributes of the shared system 14 and explicit input of samples of preferred items by the user through a user interface 22. Evidence of the users preference is largely gathered by implicit evidence of items that are liked or disliked by monitoring the user's activity. A positive vote is given to an item that the user dwells over for a threshold period of time, while negative votes are given to items that are briefly reviewed and jumped away from for review of other content. Furthermore, a user via the user interface 22 may select an item for a positive or negative vote. For example, in a first iteration a user may be presented with a list of reviewed items for a selected time period. A user may then select amongst a variety of filtering components residing in a filtering system 20. Additionally, the user may select or provide positive or negative votes for items. The modified or filtered reviewed item list may then be inputted into the inference system 18 as further evidence of user preferences.

The inference system 18 can then provide a recommendation list of items ranked by preference values to the local storage system 27. The local storage system 27 then stores or records items that have the highest values. Items can be assigned higher values based on the likelihood that a user would like to view that item. Furthermore, values of items can be aged out based on a cache retention policy. Such policies can be sensitive to the class of content cached. For example, the value of news broadcasts may decay more quickly with the age of the content, in comparison to documentary material covering a topic area that a user has conveyed an interest. In one aspect of the invention, a utility-directed knapsack analysis is continuously performed to store newly available content into available memory, based on the consideration of the "expected value density" of the content, which is defined as the ratio of the value assigned to some media content and the memory cost of storing the content based on the size of the content.

The inference system 18 ranks selections based on viewing habits of users of the system 10 in addition to being able to consider time segments or intervals of those viewing habits. The inference system 18 considers the temporal history of the content viewed by users of the system (e.g., a multi-user system) and dates the list of available information 28 (e.g., available media) that will be made available by an information delivery system 26. The inference system 18 scores active user events for every title stored in the database 12. The inference system 18 then provides a reviewed items list and a ranked recommendation list based on a requested time period to the user interface 22 via the filtering system 20. The ranked recommendation list contains recommendations of selectable titles within the time period requested from a particular time segment via the user interface 22. The inference system 18 provides the ranked set of titles that may be of interest to a system user based on similar titles that the users of the system have historically viewed in that time segment. The filtering system 20 includes various filters for adding, deleting or modifying the reviewed items list (e.g., assigning positive or negative votes to items) and inputting the new evidence of preferences into the inference system 18 for updating of the reviewed items list and the ranked selectable information list. For example, a popularity filter may be employed to provide shows of interest that users of the system are not likely to know about. Furthermore, text descriptions of items may be added to the reviewed item list employing a search engine or the like. The new preferences may be inputted into the inference system 18 and a new recommendation list generated.

Once a selection of a title to view is made by a user via the user interface 22, a request is transmitted to the information delivery system 26, which transmits the requested information corresponding to the selected title to a viewer 24. The viewed information can be transmitted from the local storage system 27 (e.g., a local hard drive) or directly from the remote information system 25. Alternatively, a portion of the information can be stored in the local storage system 27 and transmitted to the viewer 24, while the remaining information is transmitted to the local storage system 27 from the remote information system 25, until the entire contents of the selected information has been viewed.

The viewed information is then transmitted back to the previously viewed information database 12 for logging and for providing the viewed title and time segment information to the inference system 18 for further training of the inference system 18. This ensures that the inference system 18 is continuously and automatically being updated with the latest viewing information. A system user may also select information to be recorded via the user interface 22 to the local storage system 27, which is then recorded for later viewing, or for viewing when data is viewed at a faster rate than it can be transmitted from the remote information system 25.

Although, the inference system 18 is described with respect to a single probabilistic model, a plurality of time interval models can be trained and employed utilizing selections of previously viewed information over a respective time interval. Furthermore, the inference system 18 can employ a single probabilistic model in which previously viewed information is provided with a time stamp according to event occurrence for each time interval or segment. In other words, a title being selected within two different time intervals is treated as different event occurrences, such that training is performed as if the event occurrence has occurred with a totally different title.

It is to be appreciated that the present invention is particularly suited for providing selected titles of television programs or other multimedia to be stored locally in a local cache of a set top box or the like. In this type of application, multiple members or users in a family utilizing a single television system make it improbable to determine preferences for any particular member of the family. Therefore, the present system and method are ideally suited for this application because household viewing habits are typically consistent at different times of a day for weekdays, weekends and holidays. For example, children may watch children shows early Saturday mornings, while adults may watch different types of shows at different time periods, for example, soap operas at mid-afternoon, sports on weekends, news at night and more adult oriented shows late at night. The probabilistic prediction models of the present invention apply time segmenting to a local caching system for determining probable program selections based on the temporal history of media viewing habits in a household.

Figure 2:
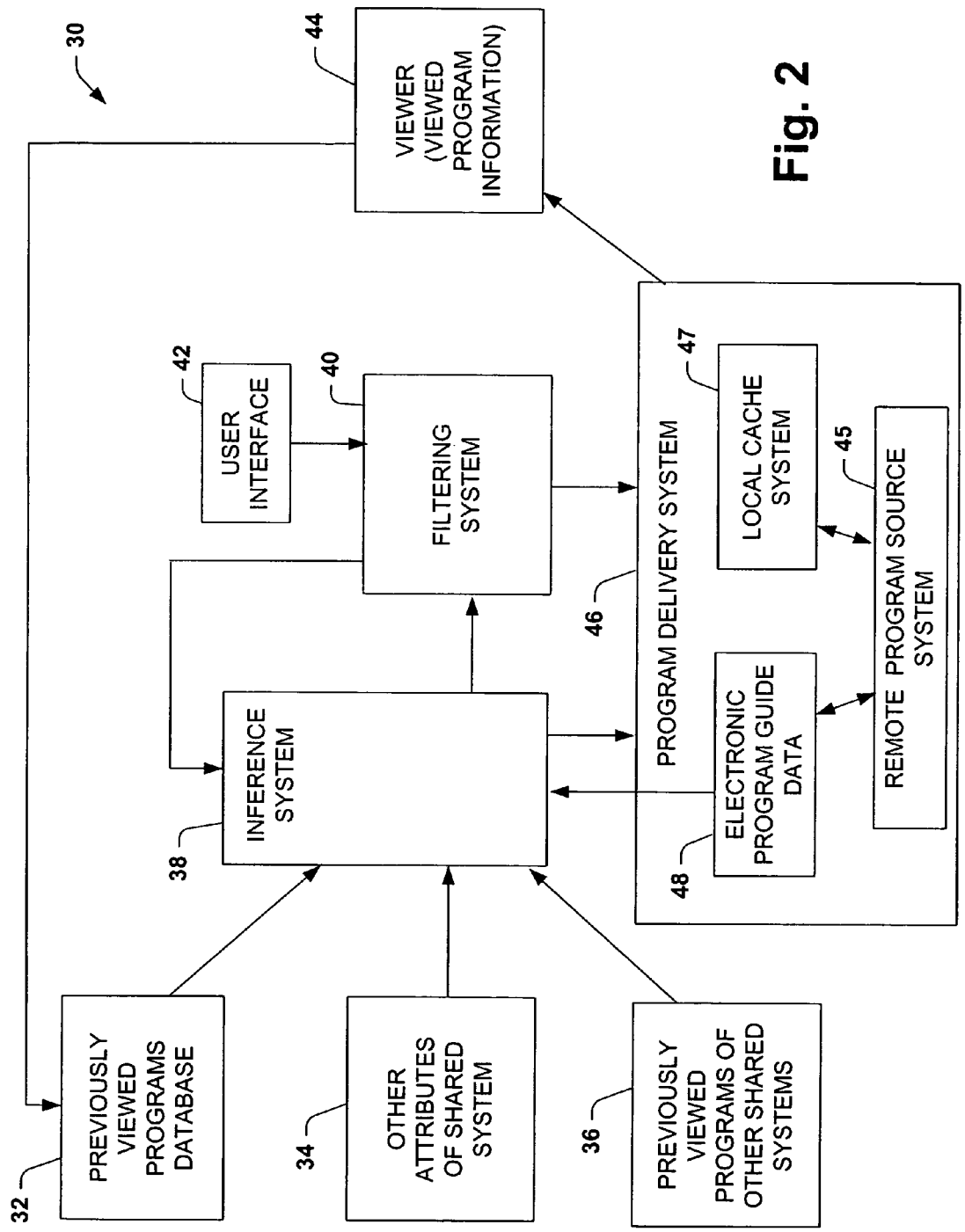
FIG. 2 illustrates a block diagram of an inference system being employed in a multimedia system in accordance with one aspect of the present invention.

FIG. 2 illustrates an example of multimedia system 30 utilizing an inference system 38 employing probability predictive model techniques, such as time based collaborative filtering techniques. The inference system 38 ranks selections based on viewing habits of users of the system 30 in addition to considering time segments or intervals of those viewing habits. Various probabilistic predictive model techniques may be employed to carry out the present invention with respect to an application of a multimedia system. The inference system 38 receives titles of previous viewed programs that are logged in a database 32. Each title is time stamped with different time segments and the percentage of the complete program that the user has watched is logged in the database 32. The log data is annotated with distinctions about the time of the day that a system user has watched the television program.

As previously mentioned, a day can be segmented into early morning, mid-morning, afternoon, late afternoon, early evening, evening, late night. Additional segments can include information that is viewed on weekdays verse weekends. Furthermore, non-weekdays can be further subdivided into Saturday, Sunday and holidays. Elements from a dataset are considered tagged with these time segments or intervals and trained with this data. The inference system 38 considers the temporal history of the programs viewed by users of the system (e.g., family members of a household) and dates and times of electronic program guide data 48 of available programs that can be made available by a program delivery system 46. The inference system 38 scores active user viewing for every title stored in the database 32.

In a training mode, the inference system 38 utilizes selections of previously viewed programs that are logged in a user's database 32 and selections of previously viewed programs that are logged in databases 36 of other shared systems. It is to be appreciated that the database information may be stored locally at the system 30, remotely at a remote server or the like (e.g., in a single database) or across a number of servers. Additionally, the inference system 38 may reside locally at the system 30, remotely at a remote server or across a number of servers. The inference system 38 is trained by examining selection reviewed by a large pool of users for more than a threshold amount of time. Negative votes are also considered by monitoring selections jumped away from after being reviewed briefly. In real-time, appropriate information or evidence about a user's preferences is inputted into the inference system 38. Evidences of preferences include information about previously selected programs from the database 32, other attributes of the shared system 34 and explicit input of samples of preferred items by the user through a user interface 42. Evidence of the users preference is largely gathered by implicit evidence of items that are liked or disliked by monitoring the user's activity. Temporal filtering can then be employed to provide a reviewed item list and a recommendation list for a particular time segment.

Furthermore, a user via the user interface 42 may select an item for a positive or negative vote. For example, in a first iteration a user may be presented with a list of reviewed items for a selected time period. A user may then select amongst a variety of filtering components residing in a filtering system 40. Additionally, the user may select or provide positive or negative votes for items. The modified or filtered reviewed item list may then be inputted into the inference system 38 as further evidence of user preferences.

The inference system 38 can then provide a recommendation list of programs ranked by preference values to a local cache system 47. The local cache system 47 then stores or records items that have the highest values. Items can be assigned higher values based on the likelihood that a user would like to view that particular program. Furthermore, values of programs can be aged out based on a cache retention policy. Such policies can be sensitive to the class of content cached. For example, the value of news broadcasts may decay more quickly with the age of the content, in comparison to documentary material covering a topic area that a user has conveyed an interest. In one aspect of the invention, a utility-directed knapsack analysis is continuously performed to store newly available content into available memory, based on the consideration of the "expected value density" of the content, which is defined as the ratio of the value assigned to some media content and the memory cost of storing the content based on the size of the content.

The output provided to the user at a user interface 42 is a personalized program guide for upcoming broadcasted media (e.g., a view of the content in the next hour or next several hours that is sorted by inferred user preferences). The user interface 42 allows a user to select the most desirable shows for later automated caching of content or give the system a go ahead for automated policies for downloading future television content that seek to maximize the value of a local cache system 47. Additionally, the filtering system 40 is provided with various filters, such that the reviewed items list may be reduced or re-ranked based on a user's input at the user interface 42.

The recommendation list is also provided to the local cache system 47 residing in a program delivery system 46. The local cache system 47 utilizes the recommendation list to determine programs to store to the local cache system 47 that a user of the system is most likely interested in viewing. The programs are delivered from a remote program source system 45, which also provides the inference system 38 with electronic program guide data 48. Alternatively, the inference system 38 can be directly linked to the local cache system 47 to provide the local cache system 47 with inferences of selectable programs that would be preferred by a system user based on previously viewed information by user's of the system 30 during a time interval of the time period being stored.

The user interface 42 allows a user the ability to select a program for viewing and/or recording. Once a selection of a title to view is made by a user via the user interface 42, a request is transmitted to the program delivery system 46 by the filtering system 30. The program delivery system 46 transmits the requested program corresponding to the selected title to a viewer 44. Information about the viewed program is then transmitted back to the previously viewed programs database 32 for logging and for providing the viewed information to the inference system 38 for further training of the inference system 38. A system user may also select programs to be recorded via the user interface component 42 to the local cache system 47, which is then recorded for later viewing or for viewing when data is viewed at a faster rate than it can be transmitted from the remote program source system 45.

Figure 3:
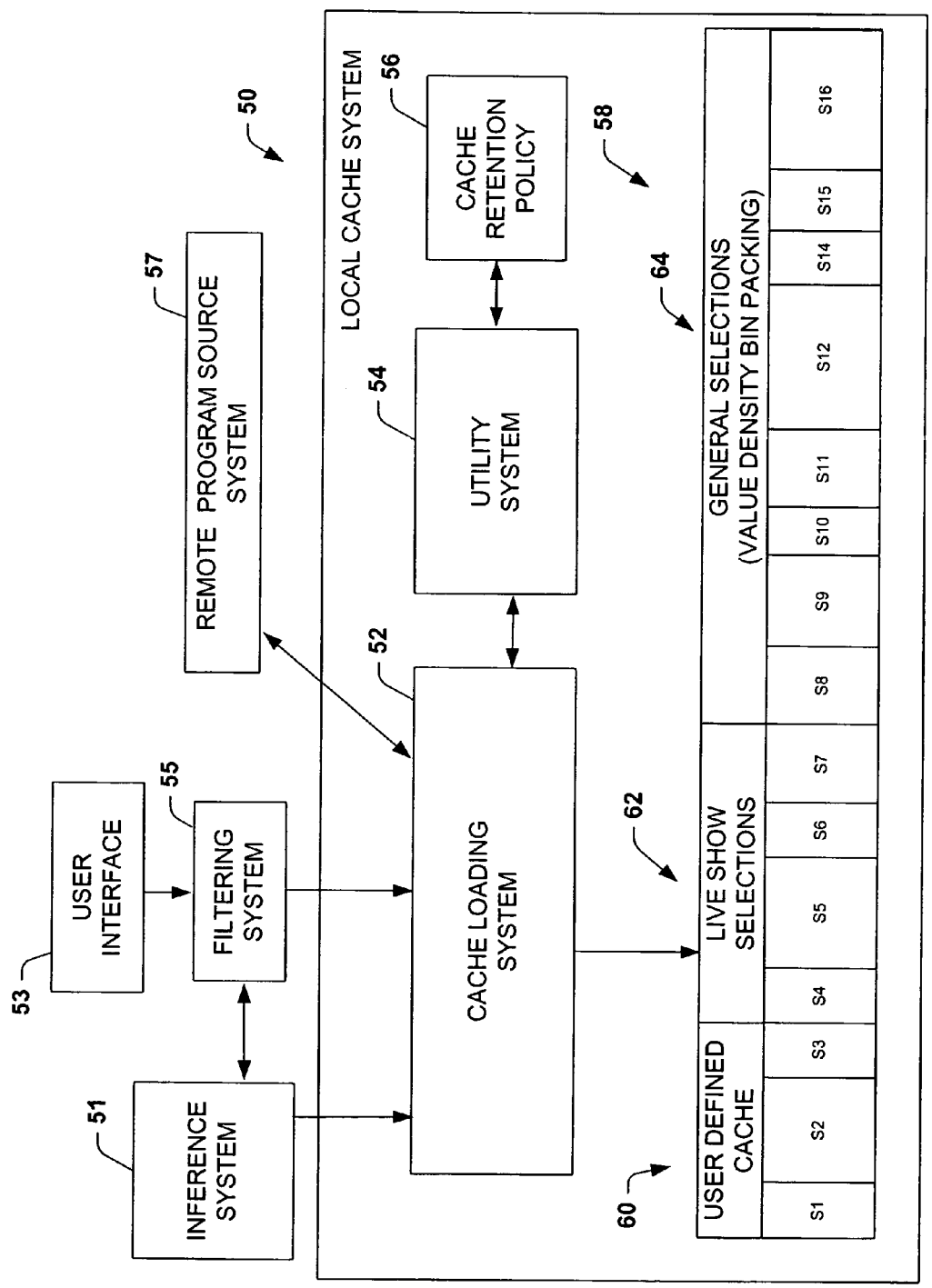
FIG. 3 illustrates a block diagram of a local storage system in accordance with one aspect of the present invention.

FIG. 3 illustrates a block schematic diagram of a local cache system 50 in accordance with one aspect of the present invention. The local cache system 50 includes a cache loading system 52 operable to receive inferences from an inferences system 51, such as recommendation ranked by preference value, and/or direct instructions to record specific program titles from a filtering system 55 via the user interface 53. Once the cache loading system 52 receives inferences and/or instructions for recording program selections, the cache loading system 52 requests program information from the remote program source system 57 and stores this information in a memory system 58 employing a utility system 54. The memory system 58 can be a hard drive residing on a television set top box, a faster memory (e.g., a RAM) or a combination of a hard drive which transfers information to a faster memory when a program is selected.

The utility system 54 employs a cache retention policy component 56 for aging out selection over time. A value assigned to a selection dynamically changes according to a set of cache retention policies. For example, a selection's value may be reduced as the selection ages because a user is less likely to view the selection over time. Additionally, the value of a selection changes based on changes on a user's viewing habits, changes in time segments or a user's modification of the predefined rules or policies. Such policies can be sensitive to the class of content cached. In one aspect of the invention, the utility system 54 continuously performs a utility-directed knapsack analysis to store newly available content into available memory, based on the consideration of the "expected value density" of the content, which is defined as the ratio of the value assigned to some media content and the memory cost of storing the content based on the size of the content.

The memory system 58 includes a first portion or user define cache portion 60, a second portion or live show selections portion 62 and a third portion or general selections portion 64. The user defined cache portion 60 stores user selected programs for recording. The live show selections portion 62 contains stored information relating to programs that are currently in process that a user may want to catch from the beginning based on previous viewing habits with the current time interval. The general selections portion 64 is the portion of memory where general programs are recorded based on the likelihood that a system user would like to watch these programs. The general programs are recommended by the inference system 51 to record for later viewing of a system user based on previous viewing habits within the current time interval. The user defined cache portion 60 includes selections S1-S3, the live show selections portion 62 includes selections S4-S7 and the general selections portion 64 contains selections S8-S16. The selections S1-S16 include programs of various time periods and sizes.

The cache loading system 52 employs a bin packing methodology to store inferred program selection information in the memory system 58. The bin packing methodology of the present invention determines a sorting value of the selection by taking the inferred value of the selection divided by the size of the selection. The bin packing methodology then sorts the program selections in the general selections portion 64 of the memory system 58 from the highest sorting value to the lowest sorting value. The bin packing methodology (hereinafter referred to as "the value density method for bin packing") ranks program information based on the probability a user will most likely want to view a program at a specified time period within a time interval for which the inference system 51 was trained.

The local cache system 50 includes the utility system 54, which monitors the memory system 58 through information stored in the cache loading system 52. The utility system 54 monitors the program selection information residing in the memory system 58 and utilizes the cache retention policy to age out the program selection information residing in the memory system 58. For example, the utility system 54 receives program loading information from the cache loading system 52 including initial value and size information. The utility system 54 keeps track of the selections and value density programs in the memory system 58 and then periodically reassigns values to the program selections using the cache retention policy component 56. The utility system 54 then transfers this information to the cache loading system 52 which then rearranges the programs in the memory system 58 based on the new values. The cache retention policy component 56 can include different cache retention policies for different classes of programs. For example, news programs and live show programs can be aged out more rapidly than documentaries or movies. Additionally, new program selection information is periodically received by the cache loading system 52, which also becomes part of the program selection set of the programs already stored in the memory system 58.

In one aspect of the invention, the available memory in the general selections portion 64 becomes totally committed. In this event, newly available content overwrites previously stored content when the expected value density of the new content exceeds the expected value density of older content. As a programs value is reduced, it eventually becomes aged out by new programs with higher values since there is only a fixed amount of memory available. For example, after a program has resided in memory for a few days, it is highly unlikely that a system user will watch this program. Therefore, the value of the program is reduced based on the cache retention policies residing in the cache retention policy component 56. It is to be appreciated that the cache retention policy component 56 may be customized for the system or programmable by a user via the user interface 53. Alternatively, the cache retention policies residing in the cache retention policy component 56 may be based on a value density aging model. The cache retention policies residing in the cache retention policy component 56 may be based on a separate model utilizing historical information of viewing habits of recorded information in general or over specific time intervals. As selections reach the end of the general selection memory portion 64 or progress in age, the information can be compressed, so that more information can be stored in the general memory portion 64. In other words, the size and the quality of the item recorded is reduced, based on the reduced likelihood that the user will watch a show so that the item can still be retained for as long as possible.

Figure 4:
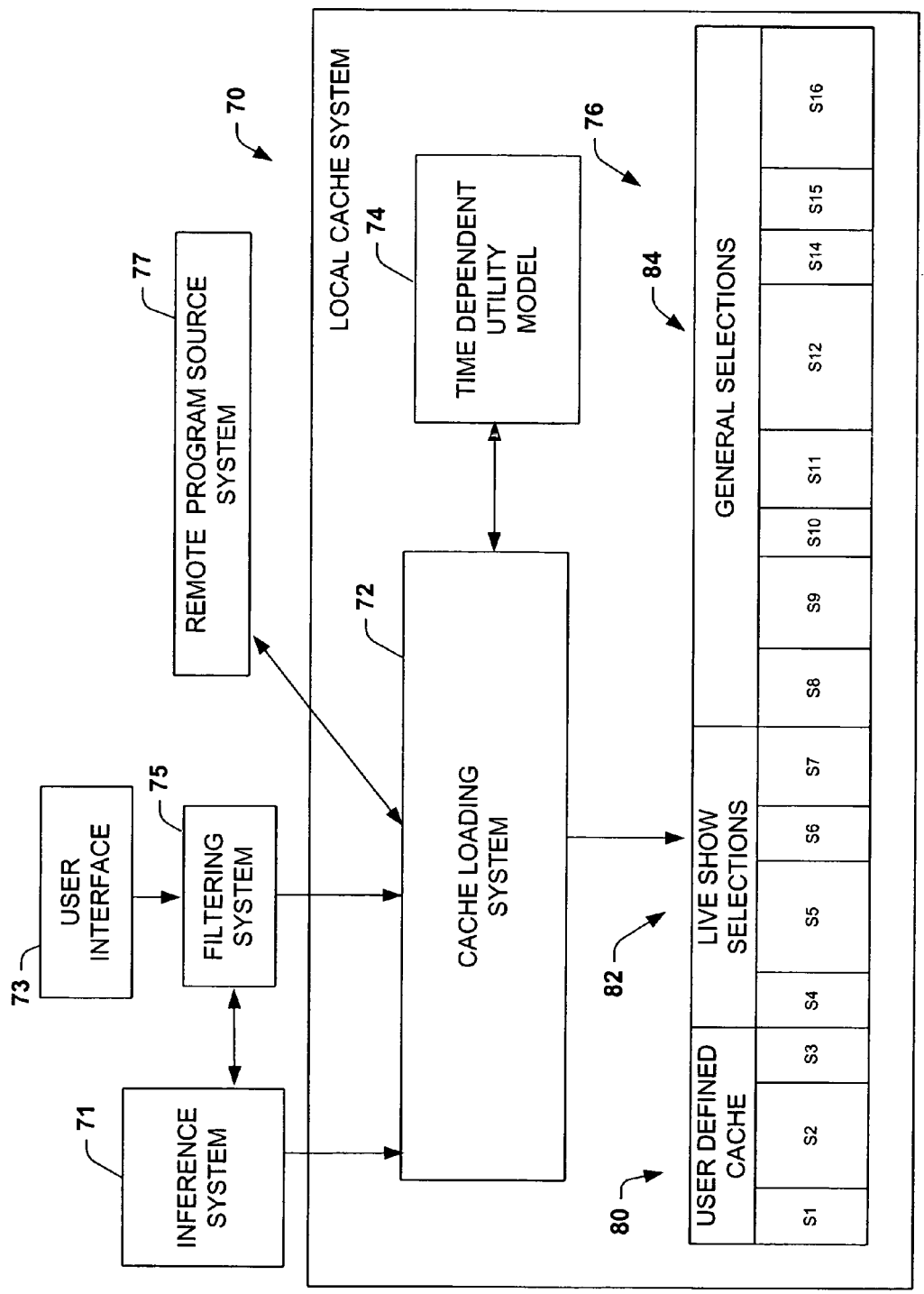
FIG. 4 illustrates a block diagram of a local storage system in accordance with another aspect of the present invention.

FIG. 4 illustrates a block schematic diagram of a local cache system 70 in accordance with another aspect of the present invention. The local cache system 70 includes a cache loading system 72 operable to receive inferences from an inferences system 71, such as recommendation ranked by preference value, and/or direct instructions to record specific program titles from a filtering system 75 via a user interface 73. Once the cache loading system 72 receives inferences and/or instructions for recording program selections, the cache loading system 72 requests program information from the remote program source system 77 and stores this information in a memory system 76 employing a time dependent utility model 74. The memory system 76 can be a hard drive residing on a television set top box, a faster memory (e.g., a RAM) or a combination of a hard drive which transfers information to a faster memory when a program is selected.

Based on the time dependent utility model 74, the expected utility of maintaining content in the memory system 76 can be determined by the ratio of the current utility as a function of the age of the item and the policy that is active for the particular item. The value of content stored in the memory system 76 decays based on the class or type of content, in accordance with the time-dependent utility model 74, for example, utility becomes a function of initial utility, age and content class. Thus, the expected value density of content stored in the memory system 76 is the ratio of the size of the object and the current utility of the object as determined by the time-dependent utility model 74.

The memory system 76 includes a first portion or user define cache portion 80, a second portion or live show selections portion 82 and a third portion or general selections portion 84. The user defined cache portion 80 stores user selected programs for recording. The live show selections portion 82 contains stored information relating to programs that are currently in process that a user may want to catch from the beginning based on previous viewing habits with the current time interval. The general selections portion 84 is the portion of memory where general programs are recorded based on the likelihood that a system user would like to watch these programs. The general programs are recommended by the inference system 71 to record for later viewing of a system user based on previous viewing habits within the current time interval. The user defined cache portion 80 includes selections S1-S3, the live show selections portion 82 includes selections S4-S7 and the general selections portion 84 contains selections S8-S16. The selections S1-S16 include programs of various time periods and sizes.

The local cache system 70 includes the time dependent utility model 74, which monitors the memory system 76 through information stored in the cache loading system 72. The time dependent utility model 74 monitors the program selection information residing in the memory system 76 and utilizes the expected value density of new and old content to age out the program selection information residing in the memory system 76. For example, the time dependent utility model 74 receives program loading information from the cache loading system 72 and keeps track of the selections and the expected value density of programs in the memory system 76. The time dependent utility model 74 periodically reassigns values to the program selections. The time dependent utility model 74 then transfers this information to the cache loading system 72 which then rearranges the programs in the memory system 76 based on the new values. The time dependent utility model 74 can include different policies for different classes of programs. Furthermore, the initial default time-dependent decay functions for each class can be continuously refined by observing and logging the likelihood that a user will observe a recorded show with the amount of time that has passed since the recording has been made and the show has not yet been watched.

In one aspect of the invention, the available memory in the general selections portion 84 becomes totally committed. In this event, newly available content overwrites previously stored content when the expected value density of the new content exceeds the expected value density of older content. As a programs value is reduced, it eventually becomes aged out by new programs with higher values. For example, after a program has resided in memory for a few days, it is highly unlikely that a system user will watch this program. Therefore, the value of the program is reduced based on the time dependent utility model 74. As selections reach the end of the general selection memory portion 84 or progress in age, the information can be compressed, so that more information can be stored in the general memory portion 84. The size and the quality of the item recorded can be reduced, based on the reduced likelihood that the user will watch a show so that the item can still be retained for as long as possible.

Figure 5:
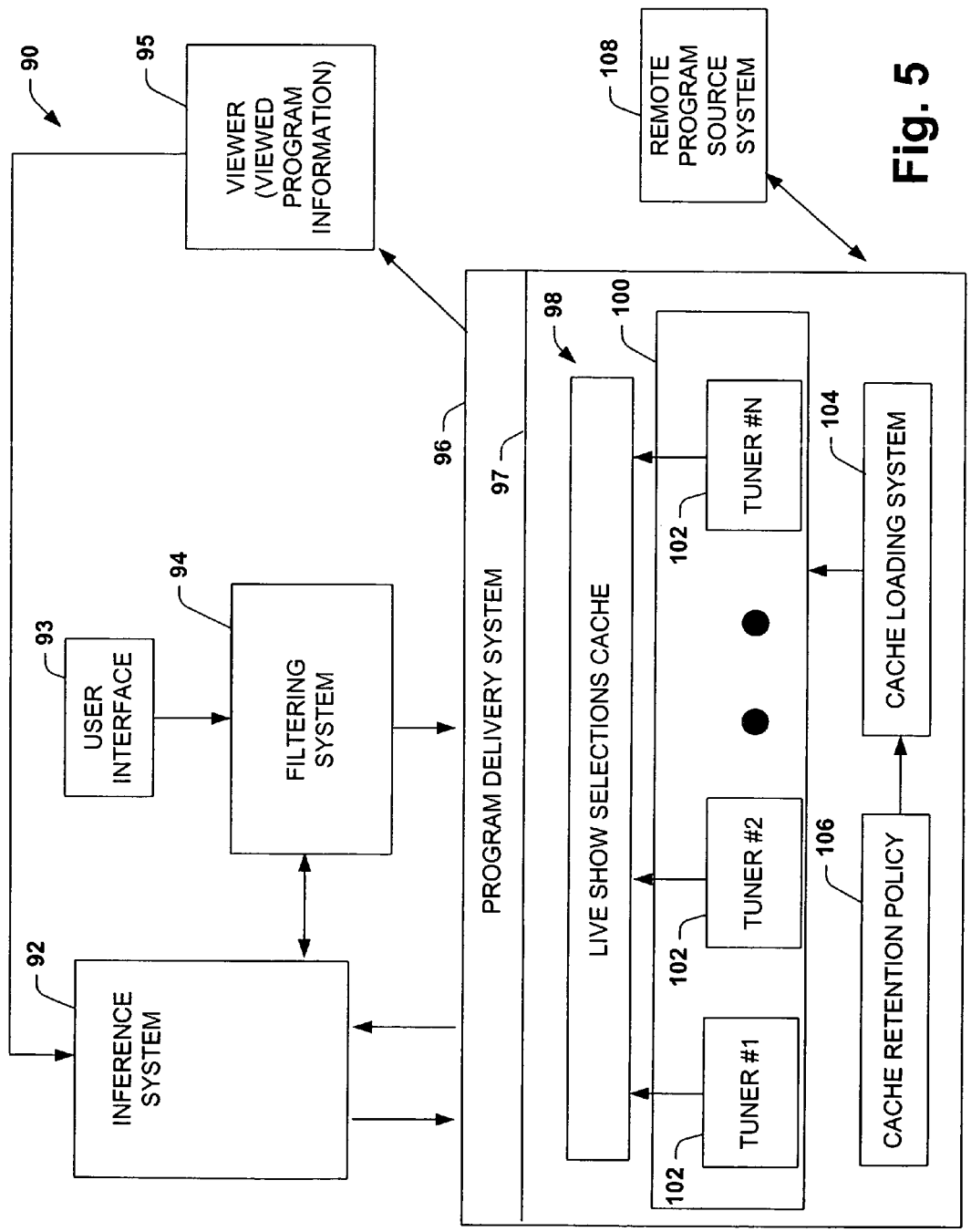
FIG. 5 illustrates a block diagram of an inference system being employed in a program delivery system including a memory storage system for recording live shows in accordance with one aspect of the present invention.

FIG. 5 illustrates a block schematic diagram of additional components of the multimedia system 90 employed to provide live show selections to a system user, so that the user may catch shows already in progress. A local cache 97 residing in a program delivery system 96 is provided with N number of tuners 102 coupled to a live show selections portion 100 of a memory system 98. An inference system 92, directly or through a filtering system 94 via a user interface 93, provides the program delivery system 96 with prediction information on which programs that a system user will most likely be interested in viewing at any given time period. A cache loading system 104 within the local cache system 97 will begin recording these programs from the beginning of the show. Once a user selects a program through the user interface 93, the filtering system 94 transmits a request to the program delivery system 96. The program delivery system 96 then begins transmitting the program from the live selections portion 100 of the memory system 98 to a viewer 95. The remaining portion of the program is recorded from a remote program source 108 as the beginning portions are transmitted to the viewer 95, so that the user may view the entire program from the beginning to the end. Other programs in the live show selections portion 100 can be removed from the memory system 98 or overwritten once a selection has been made.

At the end of a programming time period, new programs are recorded and old programs are abandoned or eventually aged out based on a cache retention policy 106. The selections for the live show selection portion 100 can be provided with a very high value during the period of time that the show is actually live and be quickly aged out after the show ends. Therefore, new live show selections are constantly replacing old live show selections. It is to be appreciated that the live show selection portion and the general selection portion of the memory system 98 can be replaced by a general memory portion employing a quick aging out methodology of live show selections. For example, live show selections can be provided with a very high value in the general memory portion and quickly aged out after the show ends. In this way, a single general memory portion may be employed for storing all program information.

In one aspect of the invention, live shows are specially treated such that shows starting at standard times (e.g., on the hour, on the half hour) for multiple shows (per multiple tuners, ranked by likelihood that a user will watch the show) are recorded, and the value of these shows are atypically high at the hour or half hour (e.g., standard starting times) that the show is running. Additionally, the live shows are decayed out more quickly given that the shows are being treated specially for the purpose of providing a service of "near real time" watching. That is for when users begin viewing, briefly after a show is already in progress.

Figure 6:
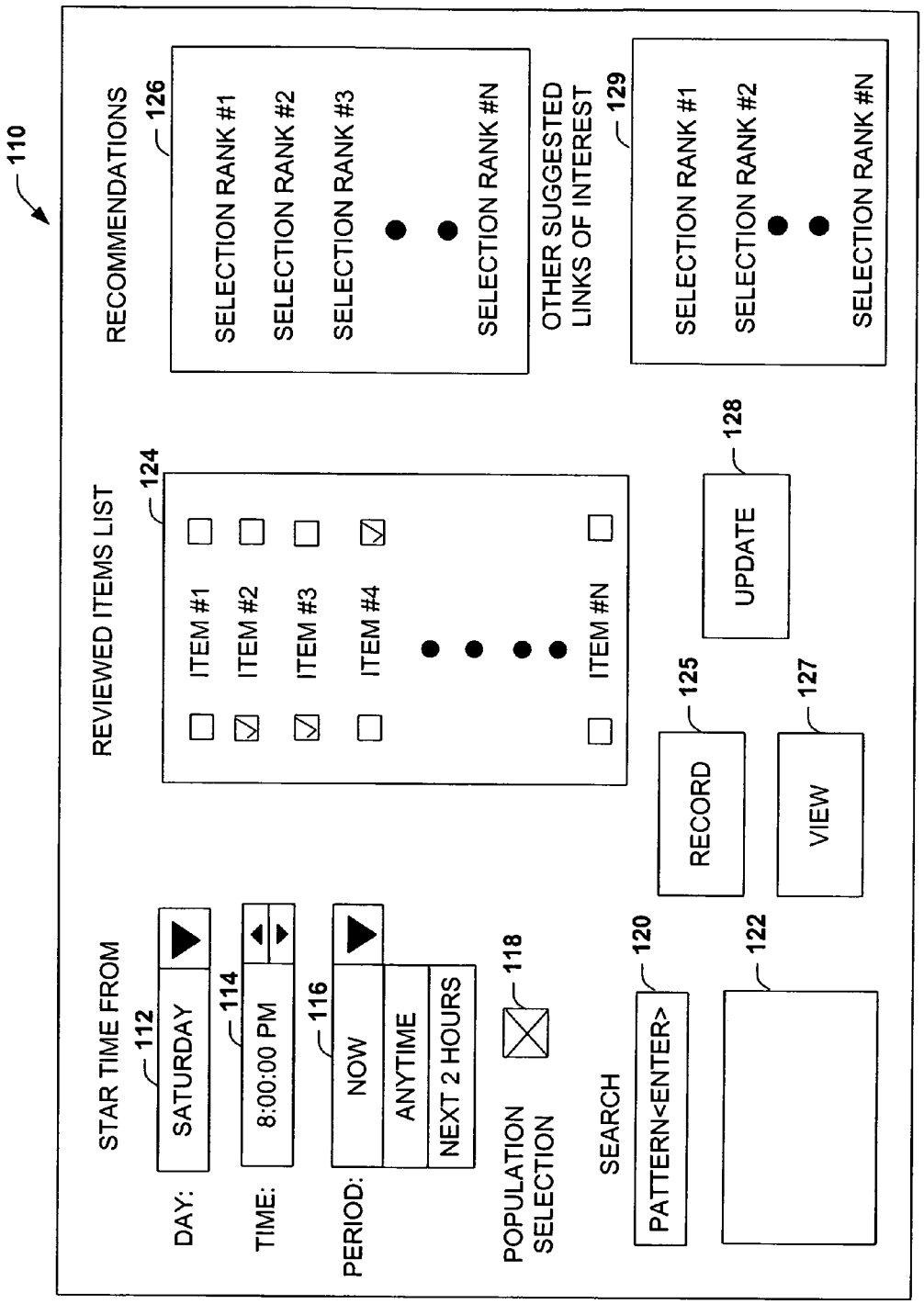
FIG. 6 illustrates a block diagram of a possible user interface of an electronic program guide in accordance with one aspect of the present invention.

FIG. 6 illustrates an example of a possible user interface 110 that allows a user to review available selections quickly without unduly searching, for example, via a remote control. A day scroll down menu 112 and a time scroll down menu 114 are provided to allow a user to select a start time for providing recommendations of program selections to the user. A period scroll down menu 116 is also provided that allows a user to select a time period for providing suggested program selections. The period scroll down menu 116 illustrates a few possible selections that a user can select, such as "now" (e.g., live selections), "anytime", or "next two hours". Other selections may be provided, such as "next 12 hours", "next day", "next week", "2 hours from now", etc. Once a user has selected a date and time to start from and a time period, the user can then select an "Update" button 128. A plurality of recommendations are then provided to the user in a recommendation window 126. The selections fall within the time period requested, and are ranked according to selections that the user is most likely to be interested in viewing and/or recording (e.g., inferred strength) based on employing inference techniques on historical data for a time interval encompassing the requested time period.

A second window 124 is provided that includes a reviewed items list. The reviewed items list includes a plurality of items that have been reviewed by users of the system. Items that the user has reviewed for a threshold period of time within a time period selected are assigned a positive vote as indicated by a check mark in a box located in a positive vote column. Items that the user has jumped away from after being reviewed briefly within a time period selected are assigned a negative vote as indicated by a check mark in a box located in a negative vote column. The reviewed items list is inputted into the inference system to provide the recommended items in the window 126. The reviewed items list is editable such that the user can edit or assign positive and negative votes to an item and select the "Update" button 128 to modify the recommended items of interest in the window 126.

A population selection box 118 is provided to allow a user to disable/enable a popularity filter. The popularity filter evaluates selections that are likely to be of interest to a user that the user is most likely not to know about. For example, a selection can be assigned a value by multiplying an inference value by the probability that the user did not know about the selection. If the population selection box is selected, a plurality of selections that a user does not know about, but may find of interest, is provided in recommendations window 126. Another window 129 provides other suggested links of interest, for example, that are downloadable for viewing. Additionally, a first search window 120 is provided for allowing a user to enter patterns for updating the evidence about the kind of show that the user is interested in reviewing. A second search window 122 is provided for displaying the results of the pattern search. A user can scan through the recommendations using a remote control or the like and choose to record the selection by choosing a "Record" button 125 or choose to view the selection by choosing a "View" button 127.

It is to be appreciated that some multimedia programs are broadcast periodically that are not live or are available via a request or a link. For these types of broadcasts the present invention is adapted to allow real-time viewing of the content by storing a portion of the program in local memory that is necessary for viewing of the content in its entirety without interruption due to viewing that occurs faster than the downloading of the content. The present invention employs methodologies that determine the needs to be downloaded, so as to allow time for the complement to be downloaded should the system sense the user is reviewing an entire program.

Figure 7:
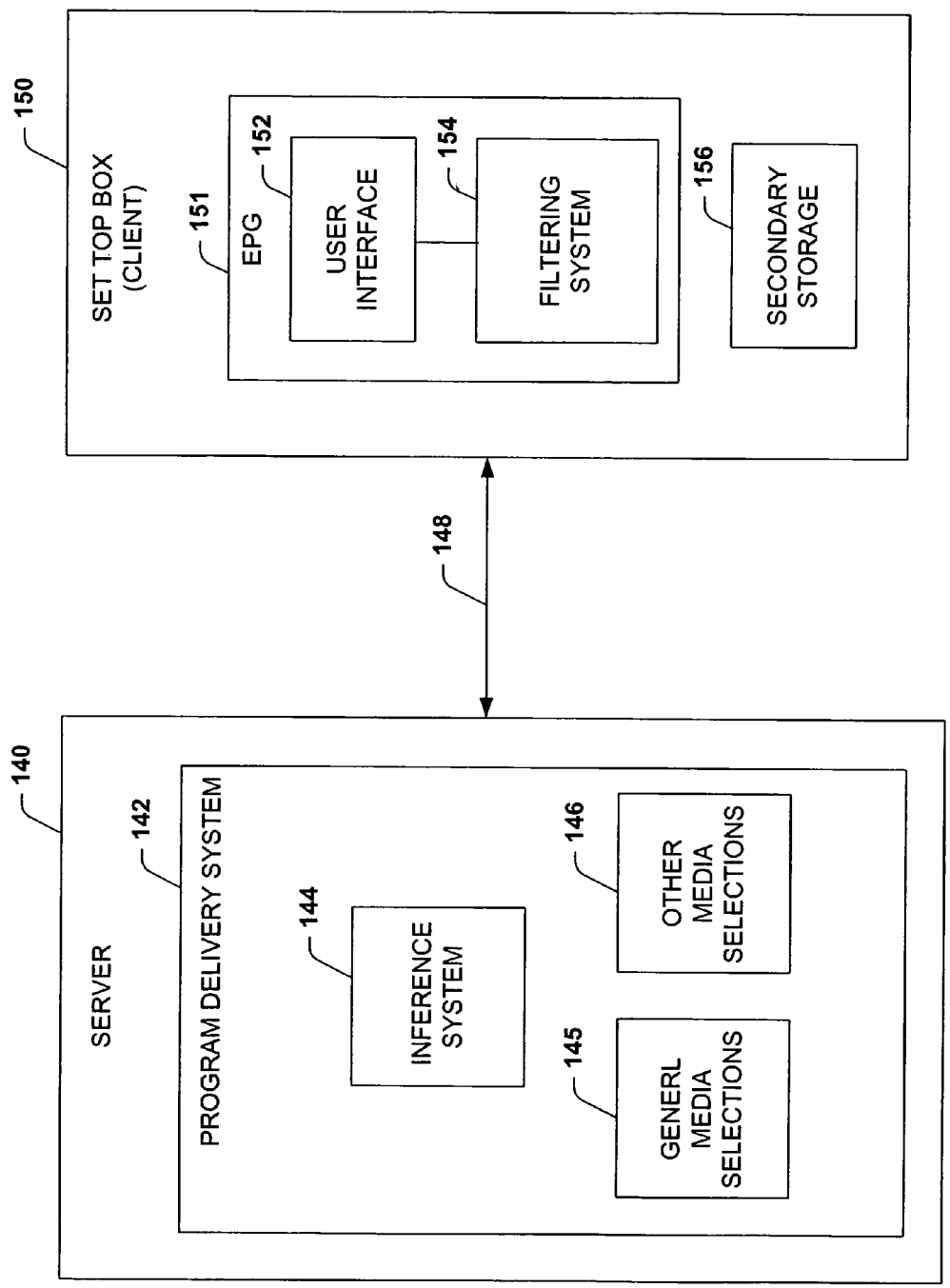
FIG. 7 illustrates a block diagram of a program delivery system residing on a server coupled to a set top box having secondary storage system in accordance with one aspect of the present invention.

FIG. 7 illustrates a program delivery system 142 that resides on a server 140 coupled to a set top box 150 of a client via a communication link 148. The communication link 148 can be via a hardwire link (e.g., a communication cable) or a wireless link (e.g., a satellite link). The program delivery system 142 includes an inference system 144 that receives general media selections 145 and other media selections 146 that are broadcast periodically or available by request (e.g., pay for viewing). The inference system 144 reviews specific viewing history of users of the set top box 150, and transmits system specific recommendations to the set top box 150. Additional system specific inference systems can be provided for each system coupled to the server 140. The set top box 150 includes an electronic programming guide system 151 comprised of a user interface component 152 coupled to a filtering system 154.

The set top box 150 also includes a secondary storage system 156 for storing portions of selections from the non-live media selection (e.g., via a link or a request) most likely to be of interest to a system user. The server 140 and the program delivery system 142 are operable to understand both the electronic programming guide system 151 and individual subscriber viewing habits based on selection made at the set top box 150. These selections can be determined by requests made at the set top box 150 or alternatively by transmitting information from the set top box 150 back to the server 140. This information is logged and used to train an inference system 144. The program delivery system 140 provides the recommendations to the set top box 150 on what selections to log in the secondary storage system 156 based on inferences determined by the inference system 144. The recommendations are determined utilizing previous viewing habits of users and the available selections from the general media selections 145 and the other media selection 146.

Figure 8:
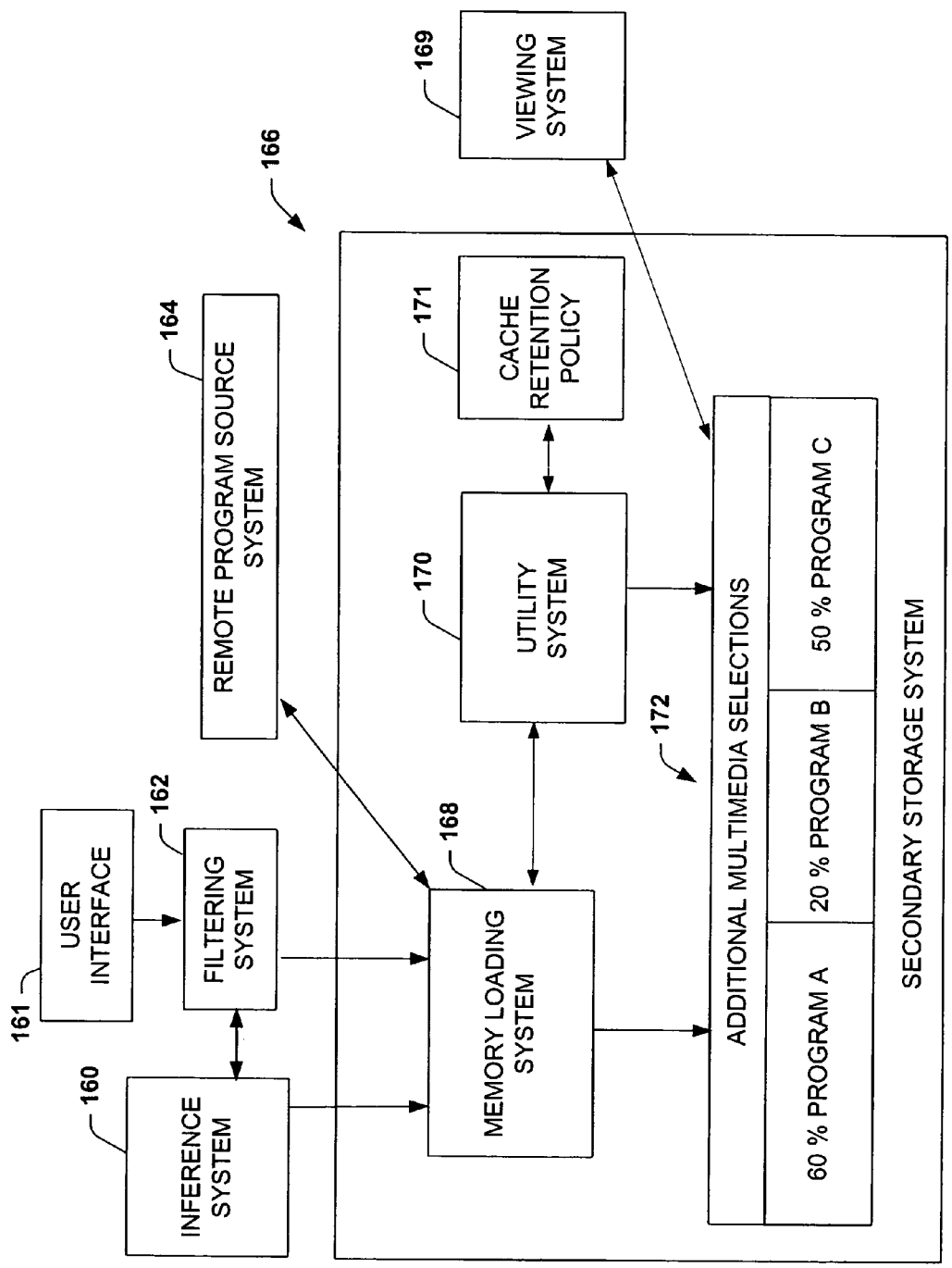
FIG. 8 illustrates a block diagram of a secondary memory system for providing real time viewing of non-live shows in accordance with one aspect of the present invention.

FIG. 8 illustrates a block schematic diagram of the secondary storage system 166 in accordance with one aspect of the present invention. The secondary storage system 166 includes a memory loading system 168 operable to receive inferences directly from an inference system 160 and/or direct instructions to record specific program titles from a filtering system 162 via a user interface 161. Once the memory loading system 168 receives inferences and/or instructions for recording program selections, the memory loading system 168 requests program information from a remote program source system 164 and stores this information in a secondary memory 172. The second memory 172 can be a hard drive residing on a television set top box, a faster memory (e.g., a RAM) or a combination of a hard drive which transfers information to a faster memory when a program is selected. The secondary storage system 166 stores portions of broadcasted programs that a user will most likely want to view at a specified time period within a time interval for which the inference system was trained. The memory loading system 168 determines the portion of the program to store based on the transfer rate of the program from the remote program source system 164 and the viewing rate of a viewing system 169. The portion of the program is then stored in the secondary memory 172. In the present example, 60% of program A, 20% of program B and 50% of program C are stored in the secondary memory 172.

A utility system 170 is coupled to the memory loading system 168. The utility system 170 employs a cache retention policy component 171 for aging out selection over time. A value assigned to a selection dynamically changes according to a set of cache retention policies. For example, a selection's value may be reduced as the selection ages because a user is less likely to view the selection over time. Additionally, the value of a selection changes based on changes on a user's viewing habits, changes in time segments or a user's modification of the predefined rules or policies. For example, if programs have not been viewed for a period of time, the value of the program is reduced and eventually aged out as new programs of higher value are loaded into the secondary memory 172. Once a user selects a program through the user interface 161, the program is transmitted from secondary memory 172 to the viewing system 169. The remaining portion of the program is downloaded from the remote program source 164 as the beginning portions are transmitted to the viewer 169, so that the user may view the entire program from the beginning to the end without interruptions. Other programs in the secondary storage 172 can be removed from the memory or overwritten once a selection has been made.

Figure 9:
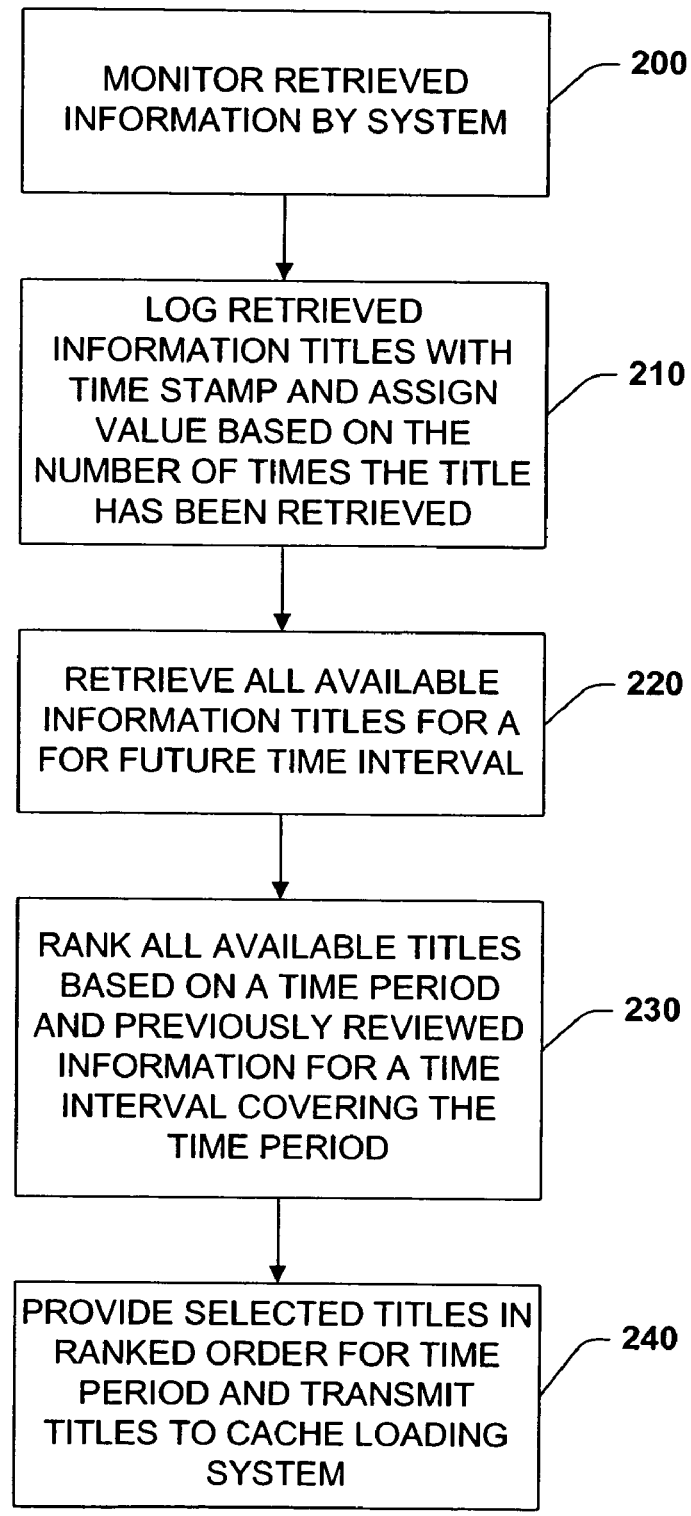
FIG. 9 illustrates a flow diagram of a methodology for providing ranked recommendations of titles of information to a memory loading system in accordance with one aspect of the invention.
Figure 10:
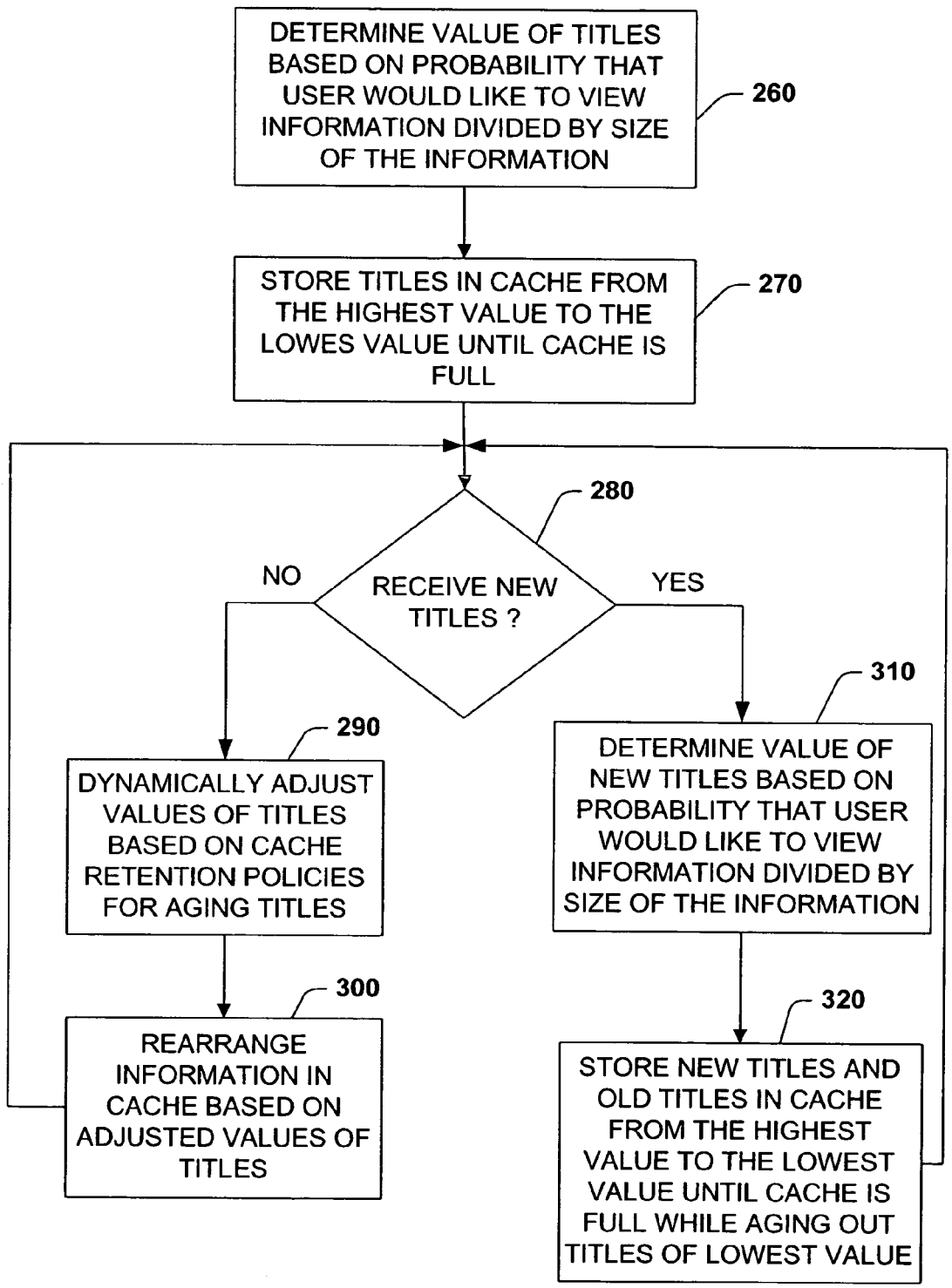
FIG. 10 illustrates a flow diagram of a methodology for storing program information in a local storage system in accordance with one aspect of the invention.
Figure 11:
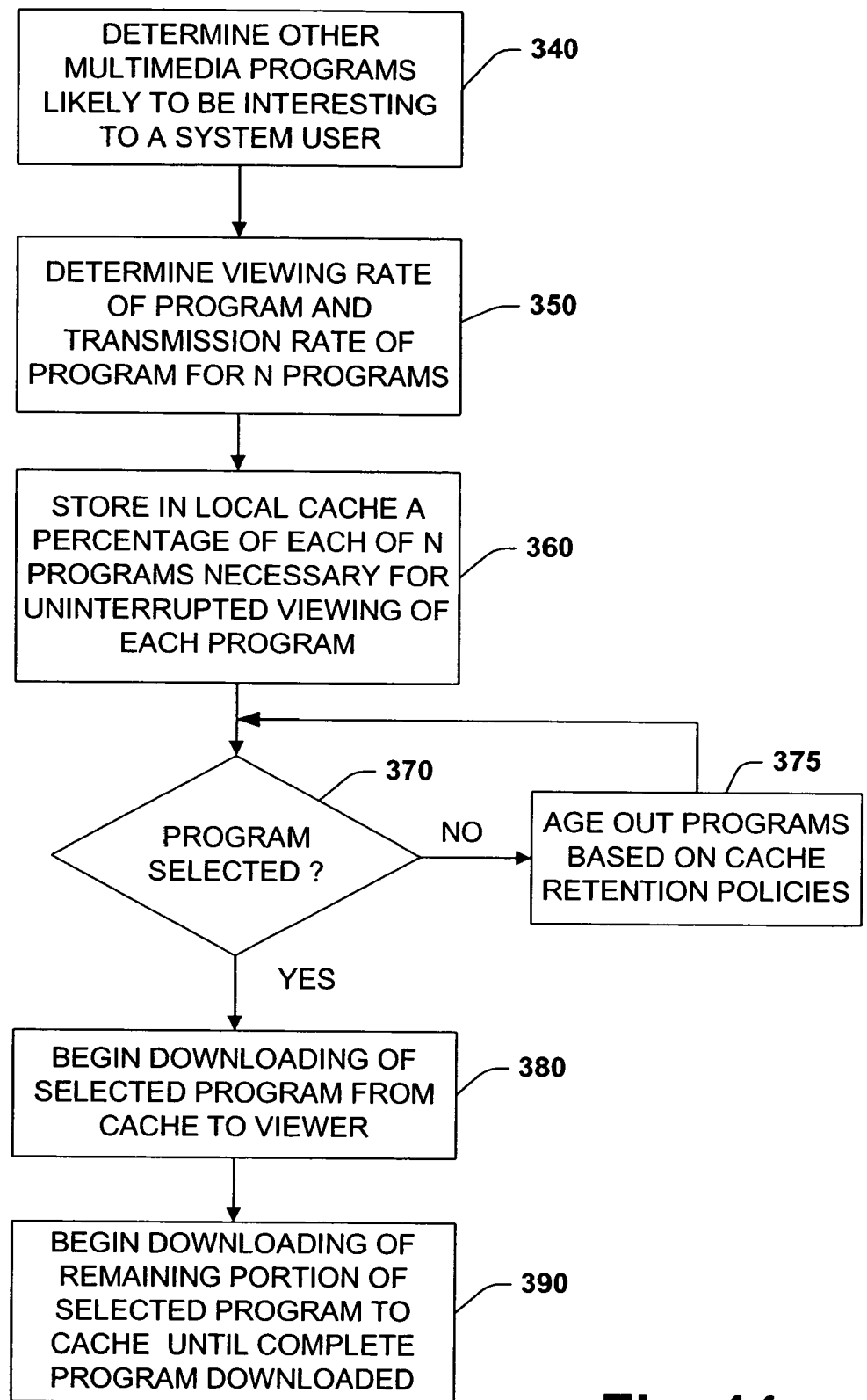
FIG. 11 illustrates a flow diagram for providing real time viewing of non-live shows in accordance with one aspect of the invention.

In view of the foregoing structural and functional features described above, methodologies in accordance with various aspects of the present invention will be better appreciated with reference to FIGS. 9-11. While, for purposes of simplicity of explanation, the methodology of FIGS. 9-11 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

FIG. 9 illustrates one particular methodology for providing a recommendation set to a local storage system employing an inference engine in accordance with one aspect of the present invention. At 200, information retrieved by the system is monitored. At 210, retrieved information titles are time stamped and logged. The retrieved information titles are then assigned a value based on the number of times the title has been retrieved utilizing inference techniques. At 220, all available information titles for a future time interval are retrieved. At 230, all available titles based on a time period and on previously reviewed information for a time interval covering the time period are assigned values and ranked. At 240, the selected titles are provided in ranked order for the time period requested. The ranked titles are then transmitted to a local cache system for loading of the ranked titles in local memory.

FIG. 10 illustrates one particular methodology for storing information in a local cache utilizing the value density bin packing method and a cache retention policy in accordance with one aspect of the present invention. At 260, a sorting value is determined for each title by determining the probability that a system user would like to view the information divided by the size of the information. At 270, titles are stored in the local cache from the highest sorting value to the lowest sorting value until the local cache is full. At 280, the methodology determines if any new titles have been received. If any new titles have not been received (NO), the method proceeds to 290. At 290, the sorting values of the titles are dynamically adjusted based on a set cache retention policies. The information is then rearranged in the local cache based on the adjusted sorting values of the titles at 300. The method then returns to 280 for repeating the step of determining if any new titles have been received. If any new titles have been received (YES) at 280, the method proceeds to 310. At 310, the sorting values of the new titles are determined based on the probability that a system user would like to view the information divided by the size of the information for each title. At 320, the new and old titles are stored in the cache from the highest sorting value to the lowest sorting value while titles of the lowest values are aged out of the cache. The method then returns to 280 for repeating the step of determining if any new titles have been received.

FIG. 11 illustrates one particular methodology for providing real time viewing of programs that are not live and are broadcasted periodically from a source to a multimedia system in accordance with one aspect of the present invention. At 340, other multimedia programs that are not broadcasted live that are likely to be interesting to a system user are determined. At 350, a viewing rate and a transmission rate of each program is determined for N programs. A percentage of each of the N programs is stored in a local cache necessary to ensure uninterrupted viewing of a selected program, at 360. At 370, the method determines if a program has been selected. If a program has not been selected (NO), the programs in the local cache are aged out based on a set of cache retention policies at 375. Once a program is selected (YES), the method advances to 380. At 380, the contents of the selected program are downloaded from the cache to the viewer. At 390, the remaining portion of the selected program is downloaded to the cache as the program is viewed, until a complete download of the program has occurred.

Figure 12:
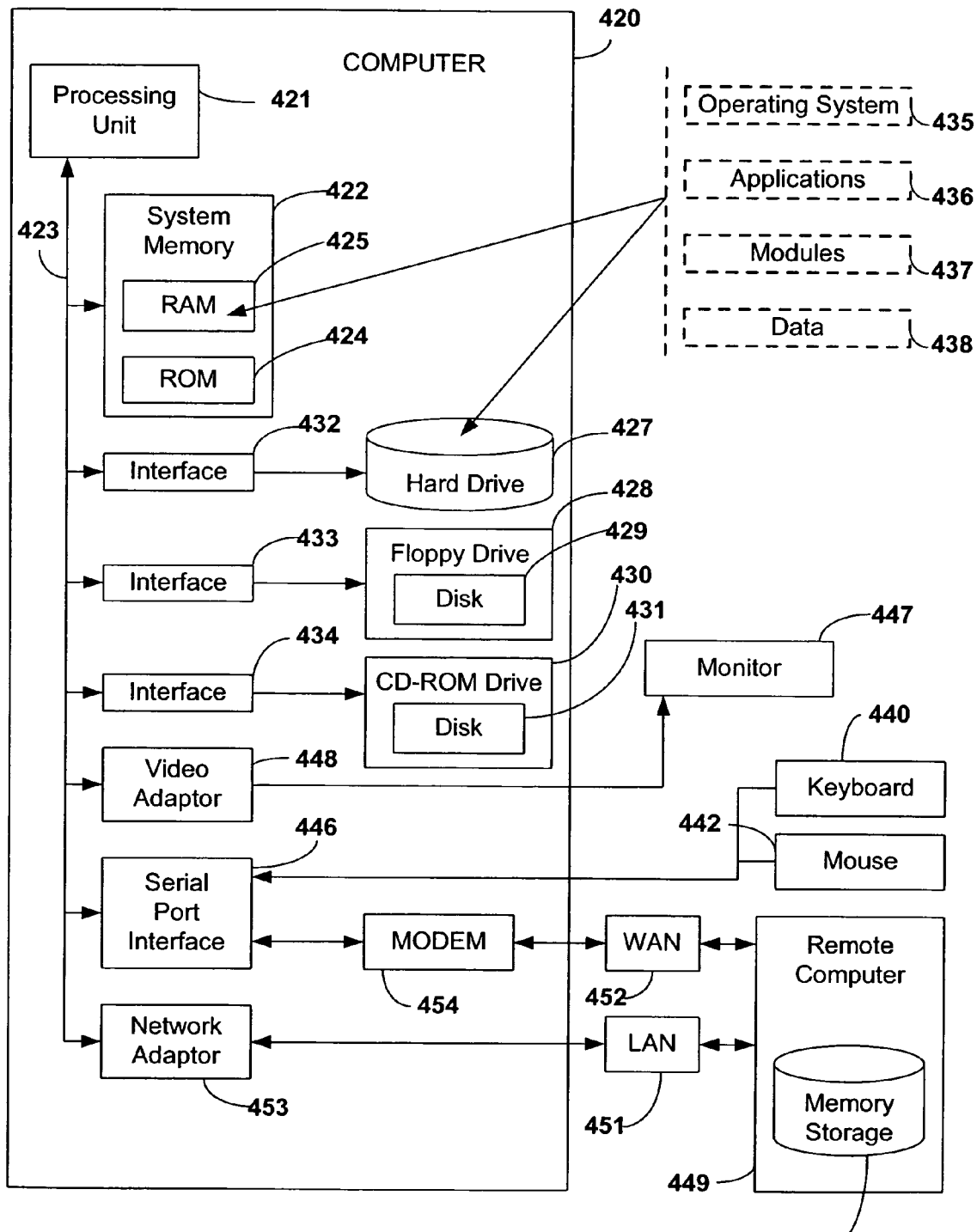
FIG. 12 illustrates a block diagram of a computer system in accordance with an environment of the present invention.

With reference to FIG. 12, an exemplary system for implementing a portion of the invention includes a conventional personal or server computer 420, including a processing unit 421, a system memory 422, and a system bus 423 that couples various system components including the system memory to the processing unit 421. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 421.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 424 and random access memory (RAM) 425. A basic input/output system (BIOS), containing the basic routines that help to transfer information between elements within the computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the server computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment. A number of program modules may be stored in the drives and RAM 425, including an operating system 435, one or more application programs 436, other program modules 437, and program data 438.

A user may enter commands and information into the computer 420 through a keyboard 440 and pointing device, such as a mouse 442. Other input devices (not shown) may include a microphone, joystick, game pad, satellite dish, scanner, or the like. These and other input devices are often connected to the processing unit 421 through a serial port interface 446 that is coupled to the system bus, but may be connected by other interfaces, such as a parallel port, game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote computers, such as a remote server or client computer 449. The remote computer 449 may be a workstation, a server computer, a router, a peer device or other common network node, and typically includes many or all of the elements described relative to the computer 420, although only a memory storage device 450 has been illustrated in FIG. 12. The logical connections depicted in FIG. 12 include a local area network (LAN) 451 and a wide area network (WAN) 452. Such networking environments are commonplace in offices, enterprise-wide computer networks, intranets and the Internet.

When used in a LAN networking environment, the computer 420 is connected to the local network 451 through a network interface or adapter 453. When used in a WAN networking environment, the server computer 420 typically includes a modem 454, or is connected to a communications server on the LAN, or has other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 420, unless indicated otherwise. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations where data bits are maintained are physical locations that have particular electrical, magnetic, or optical properties corresponding to the data bits.

The invention has been described with reference to the preferred aspects of the invention. Obviously, modifications and alterations will occur to others upon reading and understanding the foregone detailed description. It is intended that the invention be construed as including all such modifications alterations, and equivalents thereof.

What is claimed is:

1. A multimedia system including a local memory that stores information received locally from a program delivery system for viewing at a local system, comprising:
    a cache loading system that receives a list of selections from a program delivery system and stores program selection information corresponding to the list of selections in a local memory system;
    a utility system that monitors program selection information in the local memory system and communicates value information to the cache loading system for removing at least one aged program residing in the local memory system in exchange for recording of at least one new program, the new program has a higher value received by the program delivery system, the utility system continuously performs a utility-directed knapsack analysis in order to store the new program into the local memory system, the utility-directed knapsack analysis based at least in part on a ratio of a value assigned to the at least one aged program and a memory cost of storing the new program based on a size of the new program; and
    a local storage system that receives new selections with assigned values, the utility system dynamically adjusts a location of the stored information and new information based on the new selections in the local storage system, wherein the aged program is aged out of the local storage system based on an expected value density of a selection, the expected value density based on an assigned value of the selection divided by a size of the selection.

2. The system of claim 1, the local memory system comprising a first portion to define user defined selections to be stored, a second portion to define live show selection to be stored and a third portion to define general selections to be stored.

3. The system of claim 1, the utility system dynamically adjusts the assigned values based on a cache retention policy, the cache retention policy based at least in part on a memory storage cost and value of at least one program.

4. The system of claim 1, selections are grouped by class types with different cache retention policies for aging the assigned values of selections within different class types, the cache retention policies of each class type is initially defined based on a default time-dependent decay function, the time-dependent decay function being continuously refined based on the likelihood that a user will view a program based on the amount of time that has passed since the program has been recorded and not yet viewed.

5. The system of claim 1, the utility system comprising a time dependent utility model that dynamically adjusts the assigned values based on the time that the selection resides in the local memory system.

6. The system of claim 1, further comprising an inference system that receives a reviewed program list from the program delivery system, provides a recommendation list and dynamically assigns values to selections in the recommendation list based on previously viewed programs, the cache loading system stores the program selection information corresponding to the assigned values of the selections in a local storage system.

7. The system of claim 6, the inference system employing collaborative filtering techniques on a temporal history of previously viewed programs and a selectable program list to dynamically assign values to selections in a recommended program list from a higher probability to a lower probability that a user of the system would prefer to view information corresponding to an available selection, viewed programs being time stamped by event type and the inference system being based on a single collaborative filtering model that is trained according to time intervals that the information has been viewed.

8. The system of claim 7, the inference system being based on a plurality of separate collaborative filtering models, each collaborative filtering model being trained with the information from a particular time interval of temporal history that has been viewed.

9. The system of claim 7, the viewed programs being time stamped by event occurrence and the inference system being based on a single collaborative filtering model that is trained according to time intervals that the information has been viewed.

10. The system of claim 7, the inference system receives further attributes of at least one user of the system and utilizes these attributes in assigning values to selections in the selectable program list.

11. The system of claim 1, the cache loading system records live shows at any given time period for N number of shows employing N number of tuners, the shows are selected based on the temporal history of previously viewed programs within a time interval covering the any given time period.

12. The system of claim 1, the information system residing on a remote server communicatively coupled to at least one set top box, wherein a recommendation list and information corresponding to programs in the recommendation list are generated by the server and transmitted to the set top box.

13. A multimedia system including a local memory that locally stores information received from a program delivery system for viewing at a local system, comprising:
a local system having a memory loading system that determines a portion of a multimedia program, downloadable from a remote source to the local system, to store locally based on a local viewing rate and a remote transmission rate of the multimedia program;
a storage system that stores a fractional segment of the multimedia program necessary for uninterrupted viewing of the multimedia program, the storage system stores fractional segments of a plurality of down loadable selections based on a probability that a system user would like to view a selection;
a viewing system that retrieves the multimedia program from the storage system for viewing, wherein a remaining portion of the multimedia program is downloaded to the storage system while the multimedia program is being viewed until an entire multimedia program has been downloaded, the remaining portion of the multimedia program is downloaded to the storage system based at least in part on a utility-directed knapsack analysis, the utility-directed knapsack analysis based on a ratio of a value assigned to a fractional segment of the multimedia program necessary for uninterrupted viewing and a cost of storing the remaining portion of the multimedia program based on a size of the remaining portion of the multimedia program;
an inference system that determines partial segments of downloadable selections to store in the storage system based on a temporal history of previously viewed programs; and
wherein the inference system employs collaborative filtering techniques on the temporal history and a selectable downloadable program list to dynamically assign values to selections in a selectable program list from a higher probability to a lower probability that a user of the inference system would prefer to view information corresponding to available selections.

14. The system of claim 13, further comprising a utility system that monitors program selection information in the storage system and communicates aging information to the memory loading system for aging out older program information residing in the storage system in exchange for newer information.

15. A multimedia system including a local memory that stores television content locally that is received from a program delivery system for viewing at a local system, comprising:
a cache loading system that receives a list of live show selections from a program delivery system and stores a live show corresponding to a list of selections in a local memory system, the cache loading system employs a utility-directed knapsack analysis to store the live show in the local memory system, the utility-directed knapsack analysis based on a ratio of a value assigned a show that is no longer live and a memory cost of storing the live show based at least in part on a size of the live show;
a utility system that monitors program selection information in the local memory system and communicates value information to the cache loading system wherein high values are assigned to live show selections currently in progress, which are quickly decayed after a show is no longer live wherein live shows residing in the local memory having lower values are aged out in exchange for live shows having a higher value received by the program delivery system; and
a local storage system that receives new selections with assigned values, the utility system dynamically adjusts the location of the stored information and new information based on new selections in the local storage system, wherein an aged program is aged out of the local storage system based on an expected value density of a selection, the expected value density based on an assigned value of the selection divided by a size of the selection.

16. The system of claim 15, the cache loading system records live shows at any given time period for N number of shows employing N number of tuners, the shows are selected based on the temporal history of previously viewed programs within a time interval.

17. The system of claim 15, the cache loading system records other shows that are not live with the live shows, the live shows are provided with higher initial values than the other shows and aged out quicker when no longer live than the other shows.

18. The system of claim 15, the live show selections beginning at starting standard times, starting at one of a hour and half hour, are provided with higher initial values than other shows and aged out quicker when no longer live than the other shows, the higher initial values are determined based on likelihood that a show will be viewed by a user of the system.

* * * * *